US007047087B2

(12) United States Patent
Hantke et al.

(10) Patent No.: US 7,047,087 B2
(45) Date of Patent: May 16, 2006

(54) DOOR OPERATOR CONSOLE WITH MESSAGE CENTER

(75) Inventors: Bryan R. Hantke, Green, OH (US); Michael T. McMahon, Salem, OH (US); Gerard J. Hrusch, Paris, OH (US)

(73) Assignee: Overhead Door Corporation, Farmers Branch, TX (US)

(*) Notice: Subject to any disclaimer, the term of this patent is extended or adjusted under 35 U.S.C. 154(b) by 187 days.

(21) Appl. No.: 10/310,575

(22) Filed: Dec. 5, 2002

(65) Prior Publication Data

US 2004/0117039 A1 Jun. 17, 2004

(51) Int. Cl.
*G05B 11/01* (2006.01)

(52) U.S. Cl. .......................................... 700/17; 700/83

(58) Field of Classification Search ................ 340/521, 340/5.71; 701/1; 700/17.83

See application file for complete search history.

(56) References Cited

U.S. PATENT DOCUMENTS 4,100,581 A 7/1978 Slack et al.
4,618,896 A 10/1986 Rusyniak
4,654,728 A 3/1987 Lunsford
4,954,810 A * 9/1990 Llewellyn ................ 340/686.1
5,148,468 A 9/1992 Marrick et al.
5,565,843 A 10/1996 Meyvis
5,903,869 A 5/1999 Jacobson et al.
6,041,106 A * 3/2000 Parsadayan et al. ... 379/102.06
6,130,624 A * 10/2000 Guyer .................. 340/825.69
6,184,787 B1 * 2/2001 Morris ....................... 340/521
6,324,261 B1 11/2001 Merte
6,326,754 B1 12/2001 Mullet et al.
6,404,569 B1 6/2002 Bachschmid et al.
6,438,221 B1 8/2002 Lee et al.
6,711,474 B1 * 3/2004 Treyz et al. ................... 701/1
2003/0006888 A1 * 1/2003 Burchette et al. ........ 340/425.5
2003/0063715 A1 * 4/2003 Peplinski .................. 379/67.1

* cited by examiner

*Primary Examiner*—Anthony Knight
*Assistant Examiner*—Ronald D Hartman, Jr.
(74) *Attorney, Agent, or Firm*—Gardere Wynne Sewell LLP

(57) ABSTRACT

A console or controller unit for a garage door operator includes a message recording and playback device. The console unit may be wall mounted or configured as a remote transmitter type unit and includes a molded light transmitting switch actuator part mounted on a housing part of the console unit between an outer wall and a circuit board and comprising integrally molded door operator, garage lighting and message record, playback and erase switch actuators. LED indicators provide light for illuminating the switch actuators and for indicating a message waiting and low battery power. The message recording and playback circuitry is electrically isolated from the door operator control circuitry and is battery powered. The message recording and playback device includes a programmable microcontroller for controlling a voice message recording and playback circuit.

12 Claims, 8 Drawing Sheets

DOOR OPERATOR CONSOLE WITH MESSAGE CENTER

BACKGROUND

In the art of garage door operators and the like, it is conventional practice to provide a wall mounted console or controller for controlling the door operator by a person entering the garage from an interior room of a residential dwelling, for example, or exiting the garage into the dwelling interior. Accordingly, a wall console controller is typically placed on a wall directly adjacent the doorway between the dwelling interior and the garage for the convenience of the person wishing to open or close the garage door.

Since a wall console type controller placed as described above is a convenient location for leaving a message for a person or persons entering or exiting the garage through the aforementioned doorway, it has been determined that it would be desirable to provide a garage door operator wall console controller unit with a voice message recorder and playback device so that persons entering or leaving the garage could leave voice messages for or receive messages from other persons in a household, or other circumstances involving the location of the wall console unit. Individuals occupying a residential dwelling, for example, may wish to leave messages for other individuals who are likely to pass through the garage doorway. Accordingly, a message recording and playback device associated with a garage door operator console unit, of either a wall mountable type or a portable radio transmitter type, is a particularly advantageous combination. The present invention satisfies the above-mentioned desiderata in the art of garage door operator controllers, as will be further appreciated by those skilled in the art.

SUMMARY OF THE INVENTION

The present invention provides an improved door operator controller unit.

The present invention also provides an improved door operator controller unit which is provided with means for controlling a garage door operator as well as other elements, such as garage lighting, a voice message recording and playback device and means for controlling the device to record a voice message, playback a voice message and erase a previously recorded message.

In accordance with one aspect of the present invention a door operator wall console type controller unit is provided which is aesthetically pleasing and convenient to operate, being provided with easily identified and easily operated momentary push button type switches for controlling the door operator to open or close a garage door, for example, control garage lighting and operating a voice recorder to selectively record, playback or erase voice messages. The console unit is also advantageously provided with visual indicators to indicate if a message has been recorded and is awaiting playback, if a low battery power condition exists, and to provide general illumination for switches for controlling the door operator and the message recorder functions.

The present invention also provides an improved and aesthetically pleasing door operator wall console unit which advantageously includes an improved circuit board arrangement, an integral molded push button switch actuator part embodying multiple push button switch actuators and a unique slide type switch, commonly known as a vacation or lock switch, which is operable to deactivate the door operator to prevent unwanted operation of the door.

The present invention further provides a door operator console unit which includes switch means for controlling the door operator and a conveniently usable message recorder and playback device which utilizes battery power and is electrically isolated from door operator and lighting control switches.

The combination door operator console unit of the present invention further includes a unique array of dome type switches for interaction with a pliable plastic push button switch actuator pad, light pipes built into the switch actuator pad for transmitting light generated by circuit board mounted light sources to the exterior of the console unit for use as indicators, a low power microcontroller operable in a sleep mode and programmed to "wake up" on any change of status of the switches, and a microcontroller that is operable to debounce the switches and control the recording and playback functions of a recorder provided as an integrated circuit. The console unit also includes a control circuit operable to measure the voltage of the battery used to power the voice recording and voice playback circuitry, produce a visual "low battery" signal, and flash a visual "message waiting" signal. Separate battery power for the message recorder and playback device is provided so that the message recorder electronic circuitry has no effect on garage door operator functions and vice versa.

Those skilled in the art will further appreciate the above-mentioned advantages and superior features of the invention together with other important aspects thereof upon reading the detailed description which follows in conjunction with the drawings.

DETAILED DESCRIPTION OF A PREFERRED EMBODIMENT

Figure 1:
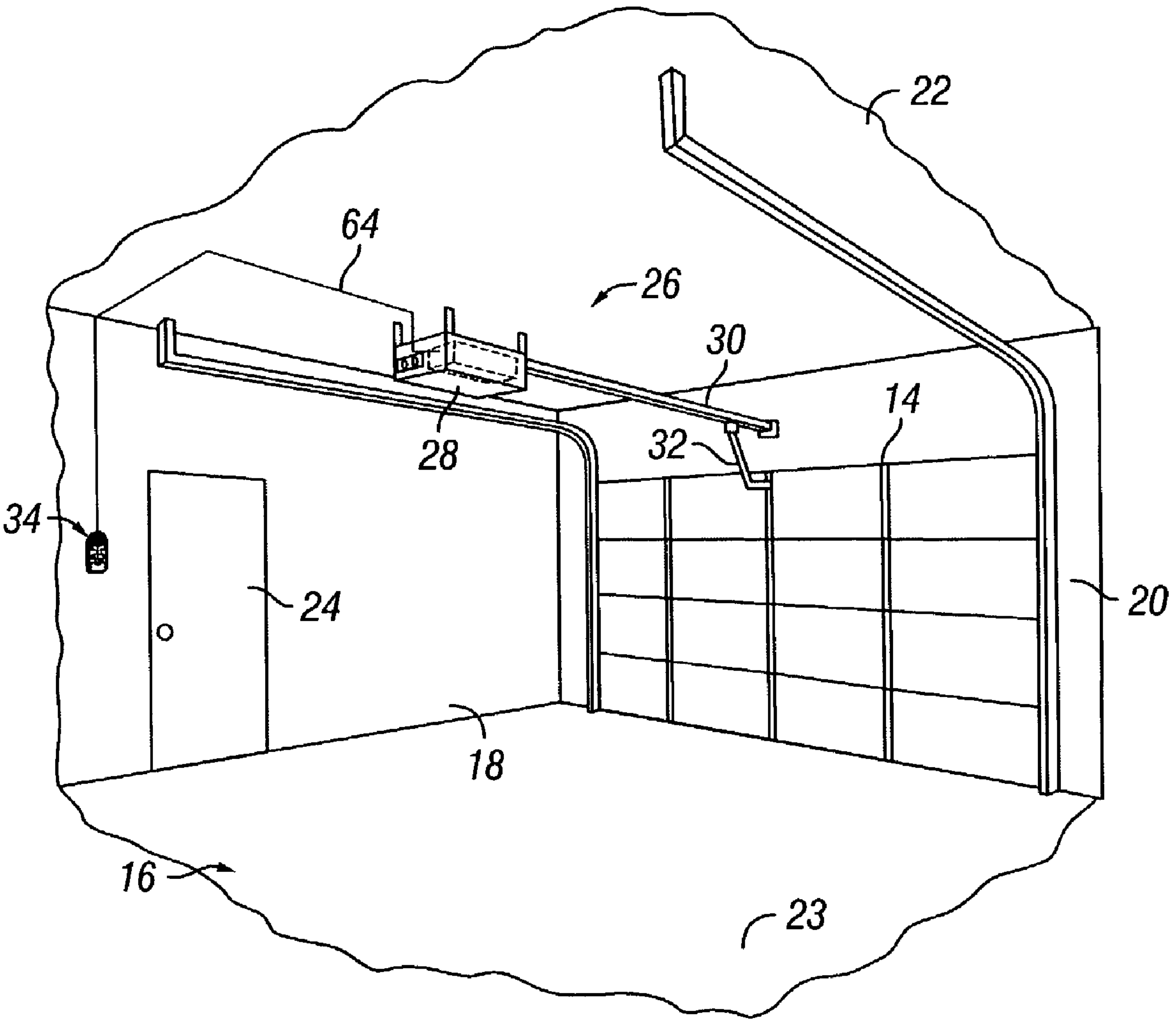
FIG. 1 is a perspective view of an upward acting garage door and operator controllable by a wall mounted console unit in accordance with the present invention.

In the description which follows like elements are marked throughout the specification and drawings with the same reference numerals, respectively. The drawing figures are not necessarily to scale and certain elements may be shown in somewhat generalized or schematic form in the interest of clarity and conciseness. Commercially available circuit elements are identified by a commercial source or by their typical or preferred performance specifications.

Referring to FIG. 1, there is illustrated a typical garage door installation for which the wall console unit of the present invention is advantageously utilized. FIG. 1 illustrates a sectional upward acting door 14 for closing a garage space 16 which may, for example, be part of a residential dwelling and having garage defining walls 18 and 20, a ceiling 22 and a floor 23, for example. Interior wall 18 includes a doorway 24 therein. Door 14 is connected to an operator 26 of a type commercially available and including a motor and control unit 28, a suitable elongated rail mechanism 30 and a connecting link 32. Garage door operator 26 may be of the type described in U.S. Pat. No. 6,118,243 issued Sep. 12, 2000 to Reed et al, assigned to the assignee of the present invention and which is incorporated herein by reference. Garage door operator 26 may be controlled by a wall console unit in accordance with the invention and generally indicated by the numeral 34. Wall console unit 34 is suitably mounted on interior wall 18 adjacent doorway 24 so that persons entering or leaving the garage via the doorway 24 may control operation of the door 14 to open or close. Operator 26 may include suitable garage lighting associated therewith, not shown in FIG. 1, as well as a reversible electric motor, comprising part of operator unit 28, for controlling movement of the door 14.

Referring now to FIGS. 2, 3, 4 and 5, the wall console unit 34 is characterized by a housing, generally designated by the numeral 36. Housing 36 is preferably formed of three molded plastic parts which snap together to enclose switches and circuitry associated with the console unit and a power source, such as a dry cell battery, for example. Housing 36 includes a somewhat pan shaped cover and base member 38 having a peripheral wall 39 integrally joined to a front wall 40, see FIGS. 2, 3 and 5. Front wall 40 is provided with a suitable speaker grille 41 and multiple, somewhat oval shaped openings 42, 43, 44 and 45, FIG. 2, for receiving push button switch actuator elements to be described in further detail herein. Front wall 40 also includes a microphone opening 46 and visual indicator openings 47 and 48, see FIG. 2 also.

Figure 2:
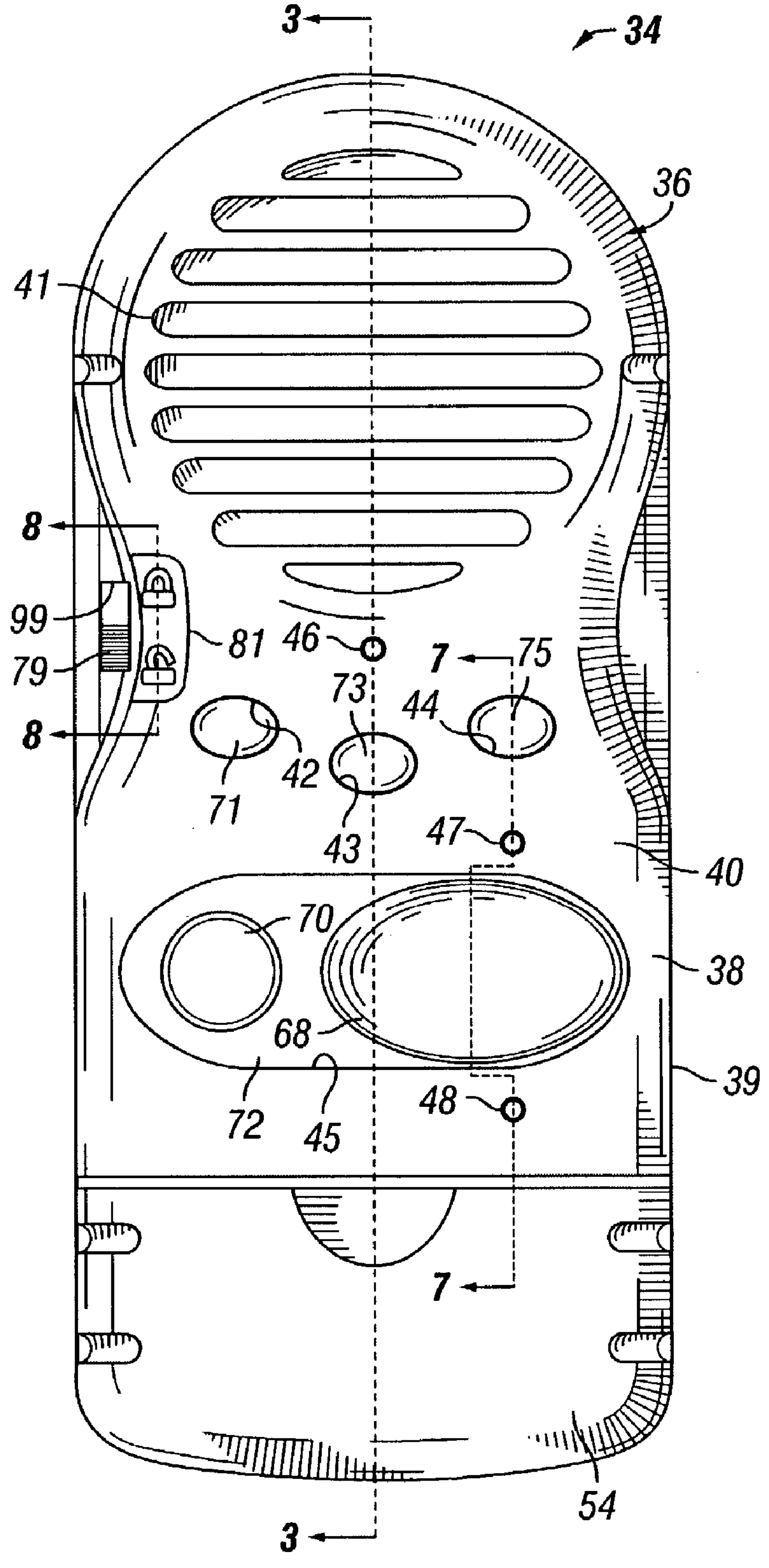
FIG. 2 is a front elevation of the wall console unit of the present invention.
Figure 3:
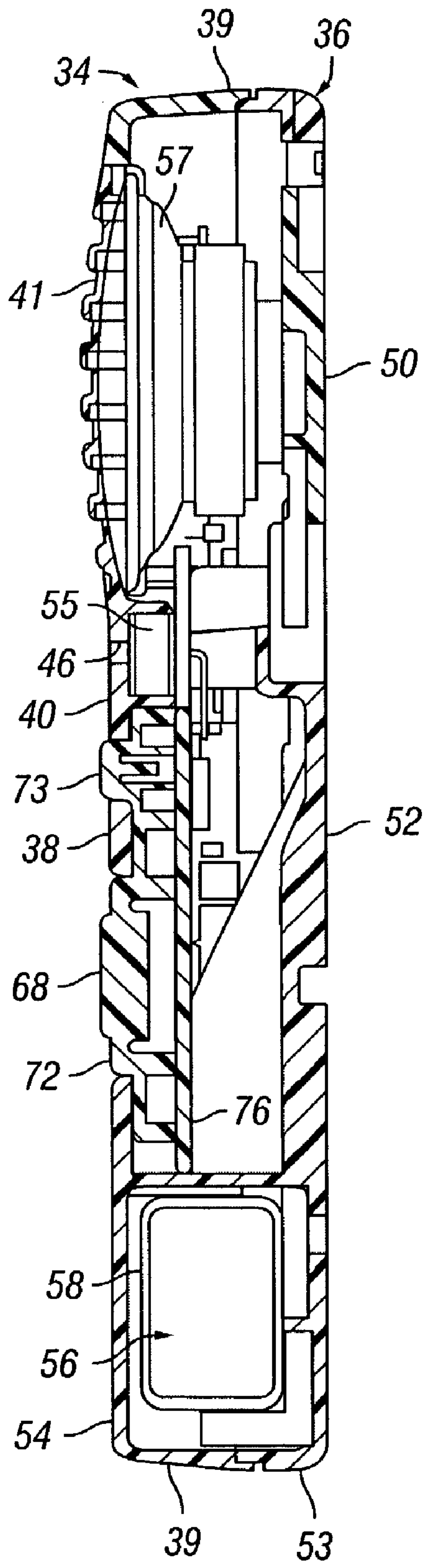
FIG. 3 is a section view taken generally along the line 3—3 of FIG. 2.
Figure 5:
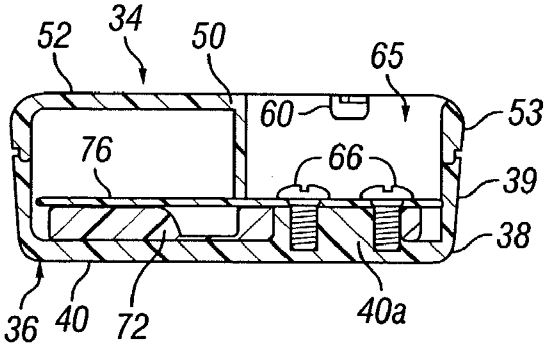
FIG. 5 is a section view taken generally along the line 5—5 of FIG. 4.
Figure 4:
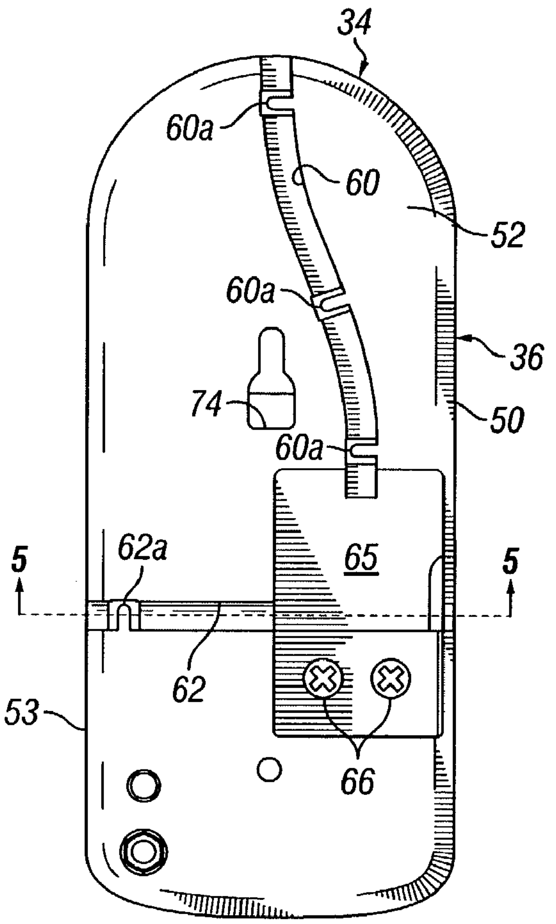
FIG. 4 is a rear elevation of the wall console unit illustrated in FIGS. 1 through 3.

Front cover and base member 38 is configured to be assembled to a rear cover member 50 in snug fitting relationship, FIGS. 3, 4 and 5. Rear cover member 50 includes a planar backwall 52 and a peripheral rim part 53 which is engageable with peripheral rim or wall 39 to form an enclosure for elements to be described further herein. Housing parts comprising members 38 and 50 may include suitable structure, not shown, for snapping the parts together and retaining the parts assembled, as shown in FIGS. 2 through 5, but allowing separation of the housing parts when needed.

Front cover and base member 38 and rear cover member 50 cooperate with a removable battery compartment cover member 54, see FIGS. 2 and 3, to provide access to a compartment 56, FIG. 3, for a suitable dry cell DC storage battery 58 disposed therein. Cover member 54 may be snapped into and out of engagement with members 38 and 50 to provide access to battery 58. Cover and base member 38 supports a microphone 55 adjacent opening 46, see FIG. 3, and members 38 and 50 also support a suitable audio speaker 57 therebetween adjacent to grille 41, as shown in FIG. 3, also.

As shown in FIG. 4, in particular, rear cover member 50 includes suitable electrical conductor receiving recesses 60 and 62 formed therein for receiving electrical conductor means 64, shown in FIG. 1, extending between the operator 26 and the console unit 34. Recesses 60 and 62 open to the peripheral wall or rim 53 and to a recess 65, FIG. 4, to provide access to screw type terminals 66 for connecting conductor means 64 to circuitry of the console unit 34 whereby the door operator and the aforementioned garage lighting may be controlled from the console unit 34. In particular, as shown in FIG. 2, push button switch actuators 68 and 70, are integrally formed on a unitary push button switch actuator part comprising a pad 72, to be described further herein, and are accessible for controlling the door operator 26 and the aforementioned lighting. Recesses 60 and 62, FIG. 4, are provided with suitable conductor retaining tabs 60*a* and 62*a*, as shown, and backwall 52 of housing part or cover member 50 is provided with a suitable keyhole shaped opening 74 for use in mounting the console unit 34 on wall 18, for example.

Referring further to FIGS. 3 and 5, the housing parts comprising members 38 and 50 support a printed circuit board 76 therebetween. Circuit board 76 is also retained in engagement with the member 38 by terminal screws 66, as shown in FIG. 5, which are threadedly engageable with a boss portion 40*a* of member 38. Switch actuator pad 72 is also disposed firmly between circuit board 76 and planar wall 40 of housing part or cover member 38, as shown in FIGS. 3, 5 and 7.

Referring again to FIG. 2, in addition to push button type switch actuators 68 and 70 for operating garage door 14 and controlling the aforementioned garage lighting, wall console unit 34 includes push button switch actuators 71, 73 and 75 for controlling operation of a voice message recorder and playback device to be described in further detail herein. Push button switch actuators 71, 73 and 75 project through the respective openings 42, 43 and 44 formed in front wall 40. FIG. 7 illustrates the general configuration of push button switch actuators 68 and 73, the latter being typical of the three push button switch actuators 71, 73 and 75. All of push button switch actuators 71, 73 and 75 are formed integral with the switch actuator pad 72 together with switch actuators 70 and 68.

Referring again to FIG. 2, the wall console unit 34 also includes a so called vacation lock switch actuator 79. Actuator 79 is mounted on front cover and base member 38 in a manner to be described in further detail herein and comprises a slide type actuator. Suitable indicia 81 is provided on wall 40 adjacent switch actuator 79 to indicate the status of the operator 26, that is, locked or unlocked. Switch actuator 79 is commonly referred to as a "vacation" switch, for example.

Figure 6:
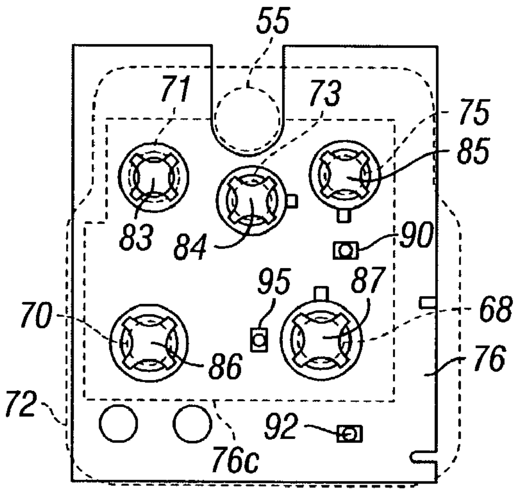
FIG. 6 is plan view of one side of a circuit board for the wall console unit and showing an arrangement of plural dome type switches.
Figure 7:
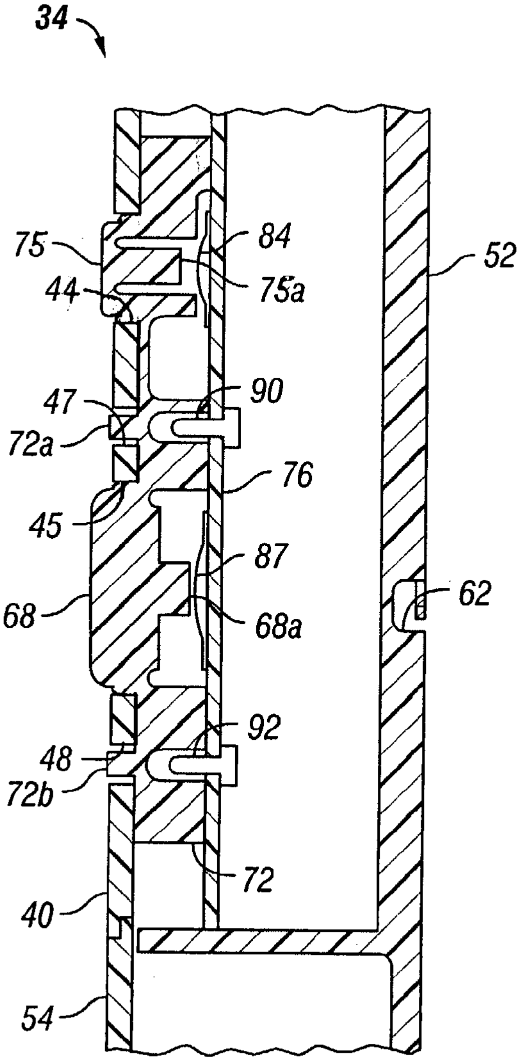
FIG. 7 is a detail section view taken generally along the line 7—7 of FIG. 2.

Referring now to FIGS. 6 and 7, FIG. 6 is a plan view of one side of circuit board 76 illustrating plural, so called dome switches 83, 84, 85, 86 and 87 which are disposed in relation to switch actuator pad 72 such that switch actuators 71, 73, 75, 70 and 68 are engageable therewith, respectively. An adhesive flexible film layer 76c overlies the dome switches 83 through 87 to protect them from environmental damage. Dome switches 83, 84, 85, 86, and 87 will be described further herein in conjunction with the circuit diagrams of FIGS. 10 and 11. Accordingly, as shown also in FIG. 7, switch actuator pad 72 is configured such that switch actuator 68 is provided with an integral boss 68*a* engageable with dome switch 87. In like manner switch actuator 75 includes a boss 75*a* engageable with dome switch 84 when actuator 73 is depressed or digitally actuated. Switch actuators 70, 73 and 75 are similarly configured and operable to engage dome switches 86, 83 and 85.

As further shown in FIGS. 2 and 7, switch actuator pad 72 is provided with spaced apart generally cylindrical pin shaped light transmitting projections or so-called light pipes 72*a* and 72*b* which extend through openings 47 and 48 in wall 40 and are disposed adjacent visual light sources, such as light emitting diodes (LEDs) 90 and 92, respectively, suitably mounted on circuit board 76, as shown in FIG. 7. LEDs 90 and 92 project into suitable recess formed in actuator pad 72, as illustrated in FIG. 7, and in proximity to the projections 72*a* and 72*b* so that these projections transmit light generated by the LEDs 90 and 92, respectively, to serve as visual indicators, respectively, that a message is awaiting playback and that power supplied by battery 58 is on the verge of depletion. Switch actuator pad 72 is preferably formed of a light transmitting, flexible material, such as molded silicone rubber.

As shown in FIG. 6, circuit board 76 also supports a third LED 95 which is disposed adjacent to switch 87 and switch actuator 68 to provide light for illuminating switch actuators 68 and 70, in particular. Again, thanks to the light transmission characteristics of the molded plastic switch actuator pad 72, illumination of the switch actuators 68 and 70, as well as switch actuators 71, 73 and 75 is provided for ease of operation of the console unit 34. Still further, switch actuator pad 72 is firmly located in its working position thanks in part to the relatively close fit between the switch actuators 68, 70, 71, 73 and 75 and the wall 40 at the respective openings 45, 42, 43 and 44 formed therein.

Figure 8:
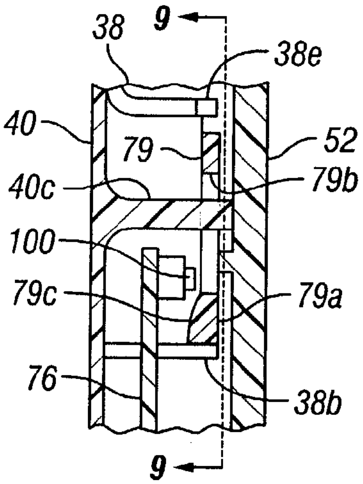
FIG. 8 is a detail section view taken generally along the line 8—8 of FIG. 2.
Figure 9:
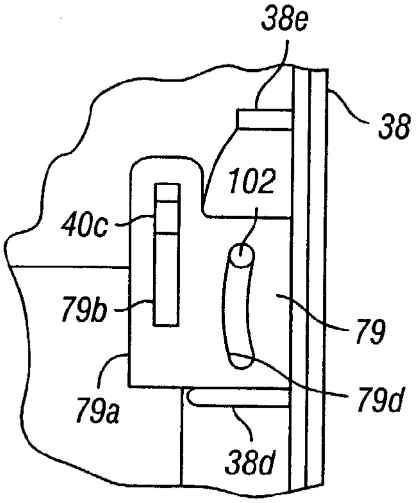
FIG. 9 is a detail plan view of the slide type vacation lock switch taken from line 9—9 in FIG. 8.

Referring now to FIGS. 8 and 9, switch actuator 79 is shown in further detail. Switch actuator 79 is supported on front cover and base housing member 38 for sliding movement within a slot 99, FIG. 2, and includes a plate-like part 79*a*, FIGS. 8 and 9, including an elongated slot 79*b* formed therein and engageable with a post 40*c* formed integral with housing member 38, see FIG. 8. A switch 100, FIG. 8, is suitably mounted on circuit board 76 in proximity to actuator 79, as shown. Plate-like part 79*a* of actuator 79 includes a cam 79*c* engageable with switch 100 in response to the sliding movement of switch actuator 79 to control whether or not operator 26 may be energized.

As shown in FIG. 9, plate-like part 79*a* of actuator 79 includes a somewhat arcuate slot 79*d* formed therein and engageable with a pin 102 formed integral with housing part 38, to provide a snap action and retention operating characteristic for the slide type switch actuator 79 to retain the actuator in its switch engaged or disengaged position but to permit snap action movement of the switch actuator 79 between positions. Suitable bosses 38*d* and 38*e*, FIG. 9, assist in supporting the actuator 79 in its limit positions.

Figure 10:
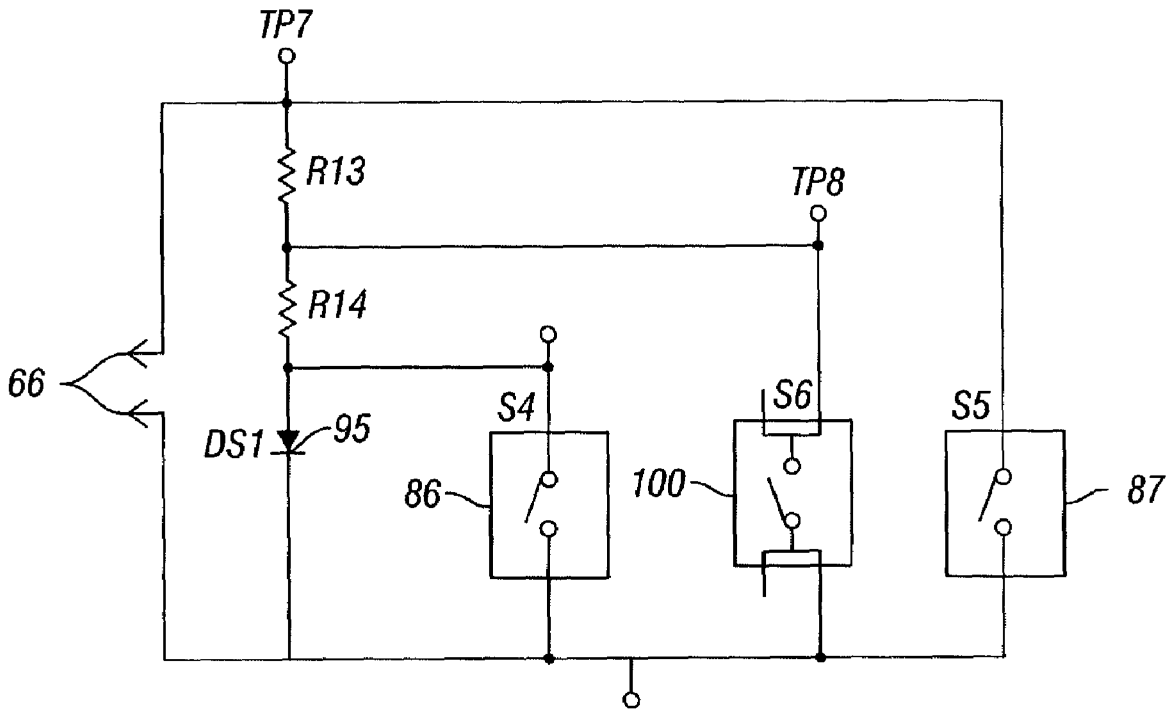
FIG. 10 is a circuit diagram of the garage door controller switches associated with the wall console unit.

Referring now to FIG. 10, there is illustrated a circuit diagram for the door operator and lighting control functions for the console unit 34. The LED 95 is in circuit with power supplied to the switches 86, 100 and 87. Multiple or multiplexing conductor means 64 is adapted to be connected to terminals 66 whereby a voltage across the switches 86, 87 and 100 is sensed by a suitable door operator circuit, not shown, associated with the operator 26 for controlling a motor to open and close the door 14, to operate suitable lighting and to disable the operator motor.

Figure 11A:
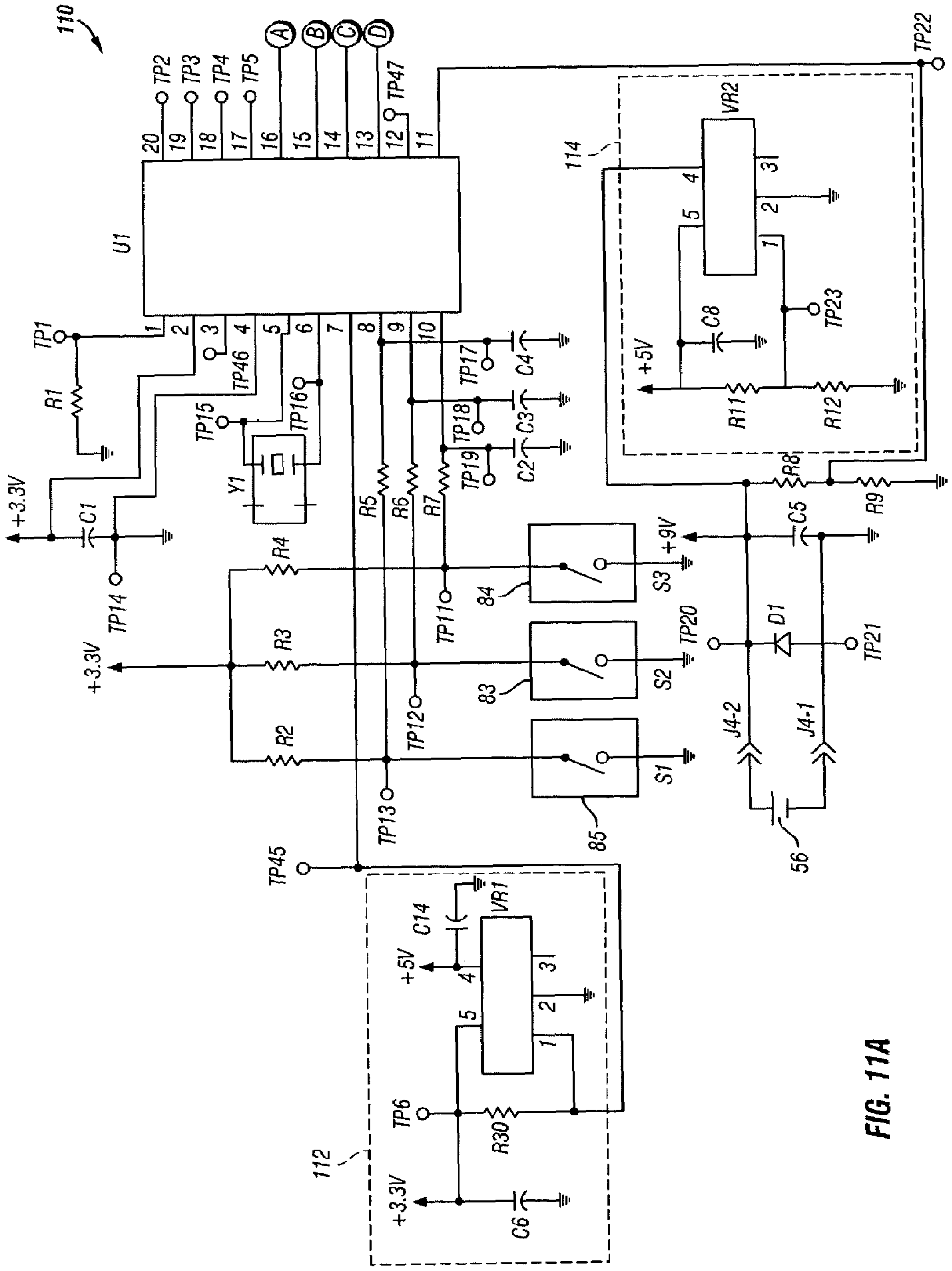
FIGS. 11A and 11B comprise a circuit diagram of the message recorder and playback device for the console unit of the present invention.
Figure 11B:
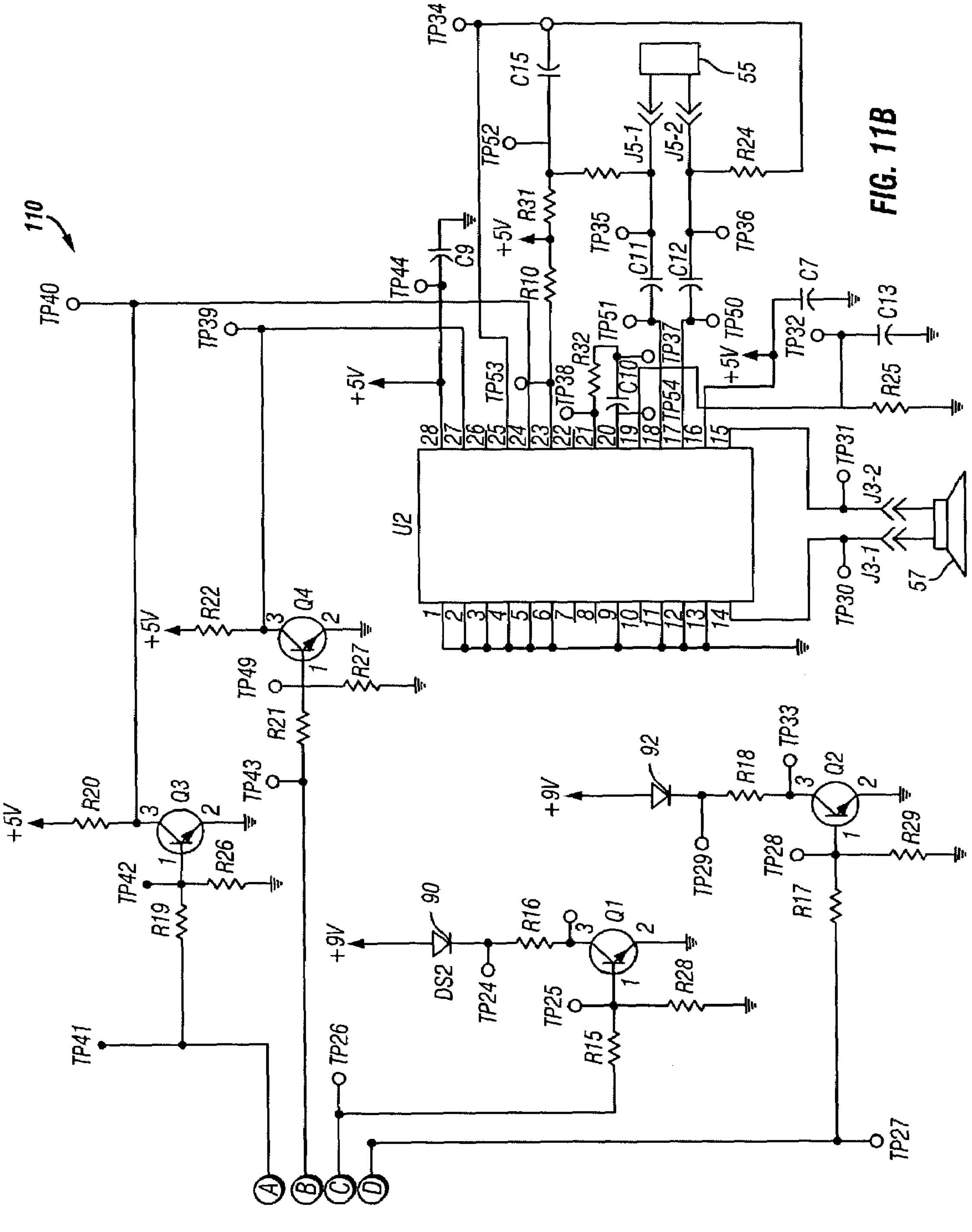

Referring now to FIGS. 11A and 11B, separate circuitry for the message recording and playback function of the console unit 34 is illustrated and generally designated by the numeral 110. FIGS. 11A and 11B are intended to be read together with circuit points of connection at the encircled letters A, B, C and D. FIGS. 11A and 11B also include several designations indicated by the letters TP followed by a single or two digit number, and are indicative of circuit test points.

The message recording and playback device and circuit 110 illustrated includes a message recording and playback integrated circuit U2, FIG. 11B, which may be of a type commercially available, such as from Winbond Electronics Corporation America as their model ISD 1420DS. Message recording and playback circuit U2 is controlled by a programmable microcontroller circuit U1 FIG. 11A, which may also be of a type commercially available, such as a model MSP 430F1101 manufactured by Texas Instruments, Inc. The circuit elements of the message record and playback device and circuit 110 are identified herein by the reference numerals indicated in FIGS. 11A and 11B. Certain elements described herein have dual designations for the purpose of Table I which follows herein.

TABLE I

| Ref. Numeral | Item Description |
|---|---|
| C1–5, 7, 9, 10–12, 14.16 | CAP. 0.1 μF X7R 10% |
| C6 | CAP. −0.47 μF X7R 10% |
| C8, 13 | CAP. −0.47 μF 16 WVDC |
| C15 | CAP. −47 μF 10 WVDC 20% |
| D1 | RECTIFIER. - PASSIVATED GLASS, SMT |
| DS1, 2, 3 | DIODE, - LED, RED, SMT |
| J3, 4, 5 | HEADER, 2 PIN MOLEX |
| Q1–4 | TRANSISTOR MPSA06 |
| R1, 15, 17 | RES. 22K 1/10 W 5% |
| R2–4, 26, 27 | RES. 1M 1/10 W 5% |
| R5–7 | RES. 10K 1/10 W 5% |
| R8 | RES. 4.75M 1/10 W 1% |
| R9 | RES. 1.33M 1/10 w 1% |
| R11 | RES. 3.16M 1/10 W 1% |
| R12 | RES. 1M 1/10 W 1% |
| R13 | RES. 82.5 1/10 W 1% |
| R14 | RES. 121 1/10 w 1% |
| R16, 18, 31 | RES. 1K 1/10 W 5% |
| R23, 24 | RES. 4.7K 1/10 W 5% |
| R25 | RES. 470K 1/10 W 5% |
| R32 | RES. 10 1/10 W 5% |
| S1–5 | SWITCH, DOME ARRAY |
| S6 | SWITCH, TACT, SPST |
| U1 | IC, MIXED SIGNAL MICRO, PRGM, SMT |
| U2 | IC, CHIPCORDER, 20 SEC, SMT |
| VR1 | REGULATOR, +3.3 V ULTRA-LOW POWER |
| VR2 | REGULATOR, +5 V HIGH INPUT |
| Y1 | XTAL 32.768 Mhz |

Nine volt DC power supplied by battery 58 is conducted to a voltage divider provided by resistors R8 and R9. Reverse polarity is prevented by diode D1. Voltage regulator circuits 112 and 114 provide regulated DC voltages of 3.3 volts and 5.0 volts supplied to circuits U1 and U2, respectively. Microcontroller functions are provided with a clock input signal via clock circuit Y1. Output signals from microcontroller U1 to record and playback circuit U2 are controlled via transistors Q3 and Q4 to provide 5.0 volt signals to the circuit U2. Voice messages are stored in circuit U2 via signal inputs from microphone 55 and playback signals are transmitted to speaker 57 from circuit U2. Message awaiting playback visual indicator 90 is controlled by a transistor Q1 which receives its operating signal from microcontroller U1. Low battery voltage visual indicator 92 is controlled by transistor Q2 which receives its operating signal also from microcontroller U1. The message erase function is controlled by microcontroller U1 in response to actuation of switch actuator 71 and message erase switch 83 which prevents circuit U2 from playing the previously recorded message. New messages are essentially recorded over previously recorded messages within circuit U2.

Substantially all of the circuit elements shown in FIGS. 11A and 11B, save the switches 83, 84 and 85, the battery 56, the microphone 55 and the speaker 57, are advantageously surface mounted on the circuit board 76 on the side opposite the side shown in FIG. 6, preferably using reflowable solder assembly techniques. Circuit elements shown in FIGS. 11A and 11B and not previously described are operable to minimize electrostatic discharge and spurious signals to the circuits U1 and U2 and otherwise condition input and output signals with respect to these circuits. The microcontroller circuit U1, is (a) programmed to operate in a sleep mode to conserve battery power until one of the switches 83, 84 or 85 is actuated, (b) debounces signals from the switches and, (c) controls the recording and playback functions of circuit U2. Microcontroller circuit U1 also measures the voltage of battery 58 and enables indicator 92 if battery voltage falls below a predetermined voltage.

The construction and operation of the console unit 34 is believed to be understandable to those skilled in the art based on the foregoing description read in conjunction with the drawings. Conventional materials may be used to fabricate the housing parts for the console unit and components described herein which are not otherwise described with respect to the type of material to be used for fabrication thereof. Operation of the console unit 34 is believed to be readily understandable from the foregoing description.

The wall mountable console unit 34 has been described in detail hereinabove. Those skilled in the art will recognize that the message recording and playback device and its function may be associated with a remote radio frequency transmitter type controller unit, such as the type commonly carried in a motor vehicle for use in opening and closing a garage door by remote control. Accordingly, the console unit 34 may be modified to include transmitter control circuitry, encoding circuitry, if desired, and a radio frequency circuit for transmitting signals to the operator 26 by way of radio frequency signal transmission instead of via the conductor 64. The operator 26 would require a suitable radio receiver and control circuit. By way of example, a remote transmitter type controller unit of the type generally as described in U.S. Pat. No. 6,049,289 to Waggamon, et al. and assigned in part to the Assignee of the present invention may be modified to include essentially all of the features of the console unit 34 necessary for providing a message recording and playback function and incorporating any other features of the console unit 34 which would be suitable for a remote control radio frequency type controller unit. The subject matter of U.S. Pat. No. 6,049,289 is incorporated herein by reference with respect to the above-described version of a console unit which includes a message recording and play-back function.

Although a preferred embodiment of a door operator console unit and message center has been described in detail herein, those skilled in the art will recognize that various substitutions and modifications may be made to the invention without departing from the scope and spirit of the appended claims.

What is claimed is:

1. A door operator console unit, particularly adapted for use in controlling a door operator for a motor operated door, said console unit comprising:

a housing;

a door operator control circuit including a door operator control switch supported on said housing for actuation to control opening and closing of said door;

a voice message recording and playback device supported on said housing including a microphone, a message recording and playback circuit, a microcontroller for controlling message recording and playback and a speaker for enunciating a recorded message;

respective switch actuators for controlling operation of said message recording and playback device whereby voice messages may be recorded and played back at will;

a door operator lock switch mounted on a circuit board supported on said housing and operable at will to disable said door operator; and a lock switch actuator mounted on said housing for sliding movement between two positions, said lock switch actuator being engageable with said lock switch.

2. A door operator console unit, particularly adapted for use in controlling a door operator for a motor operated door, said console unit comprising:

a housing;

a door operator control circuit including a door operator control switch supported on said housing for actuation to control opening and closing of said door;

a voice message recording and playback device supported on said housing including a microphone, a message recording and playback circuit, a microcontroller for controlling message recording and playback and a speaker for enunciating a recorded message;

respective switch actuators for controlling operation of said message recording and playback device whereby voice messages may be recorded and played back at will;

said housing supports a circuit board including an array of switches mounted thereon;

a switch actuator part formed of a flexible light transmitting material and including a plurality of switch actuators associated with respective ones of said switches, said switch actuator part being integrally formed of said flexible material to provide plural switch actuators responsive to digital actuation to effect operation of said door operator, said lighting and said message recording and playback device; and a light source disposed adjacent said switch actuator part for illuminating at least selected ones of said switch actuators.

3. The console unit set forth in claim 2 including:

a light transmitting projection formed integral with said switch actuator part and disposed adjacent a visual indicator for indicating a message awaiting playback.

4. The console unit set forth in claim 2 including:

a light transmitting projection associated with said switch actuator part and disposed adjacent a visual indicator associated with said message recording and playback device for indicating low voltage available from a battery.

5. A door operator console unit, particularly adapted for use in controlling a door operator for a motor operated door, said console unit being adapted for mounting on a wall, said console unit comprising:

a housing;

a voice message recording and playback device supported on said housing including a microphone, a message recording and playback circuit, a microcontroller for controlling message recording and playback and a speaker for enunciating a recorded message;

said housing supports a circuit board for said message recording and playback device and an array of switches for controlling said door operator and said message recording and playback device;

a switch actuator part formed of a flexible light transmitting material and including a plurality of switch actuators associated with respective ones of said switches, said switch actuator part being integrally formed of said flexible material to provide plural switch actuators responsive to digital actuation to effect operation of said door operator and said message recording and playback device; and a light source disposed adjacent said switch actuator part for illuminating at least selected ones of said switch actuators.

6. The console unit set forth in claim 5 including:

a light transmitting projection formed integral with said switch actuator part and disposed adjacent a visual indicator for indicating a message awaiting playback.

7. The console unit set forth in claim 5 including:

a light transmitting projection associated with said switch actuator part and disposed adjacent a visual indicator associated with said message recording and playback device for indicating low voltage available from a battery source of power for said console unit.

8. A door operator console unit for controlling a door operator for a motor operated door, said console unit being adapted for mounting on a wall, said console unit comprising:

a housing;

a voice message recording and playback device supported on said housing including a microphone, a message recording and playback circuit, a microcontroller for controlling message recording and playback and a speaker for enunciating a recorded message;

said housing supporting a circuit board for said message recording and playback device; and a switch actuator part including a plurality of switch actuators associated with respective ones of plural switches, said switch actuator part being integrally formed of a flexible material to provide plural switch actuators responsive to digital actuation to effect operation of said door operator and said message recording and playback device, said switch actuator part is formed of a light transmitting material and including at least one light transmitting projection formed thereon and disposed adjacent a visual indicator for indicating one of a message awaiting playback and low voltage available from a battery connected to said message recording and playback device.

9. The console unit set forth in claim 8 including:

a light source disposed adjacent said switch actuator part for illuminating at least selected ones of said switch actuators.

10. A door operator wall mounted console unit in combination with and operable for controlling a door operator for a motor operated door, said console unit comprising:

a housing;

a door operator control circuit supported on said housing and including a button type switch actuator for effecting operation of said door operator and at least one of a lighting control switch actuator and a door operator lock switch;

an electrical circuit isolated electrically from said door operator control circuit and including a battery power source, said isolated electrical circuit including a microcontroller circuit operably connected to a voice message recording and playback circuit, a first voltage regulator circuit operably connected to said microcontroller and a second voltage regulator circuit operably connected to said message recording and playback circuit for providing selected operating voltages to said microcontroller circuit and said message recording and playback circuit, respectively; and a switch actuator part formed of a flexible material supported on said housing and including plural integral switch actuators operable in response to digital actuation, respectively, to control said door operator and for effecting recording and playback of voice messages, at will.

11. The console unit set forth in claim 10 including:

a light transmitting projection formed on said switch actuator part and disposed adjacent visual indicator means operably connected to said microcontroller circuit for providing a visual signal indicating a message awaiting playback.

12. The console unit set forth in claim 10 including:

a light transmitting projection formed on said switch actuator part and disposed adjacent visual indicator means operably connected to said microcontroller circuit for providing a visual signal indicating low voltage available from a battery power source.

* * * * *